Sept. 6, 1966 F. W. ROHE ET AL 3,271,498
METHOD OF INSTALLATION OF MOLDABLE INSERT IN SANDWICH PANEL
Filed Jan. 27, 1964
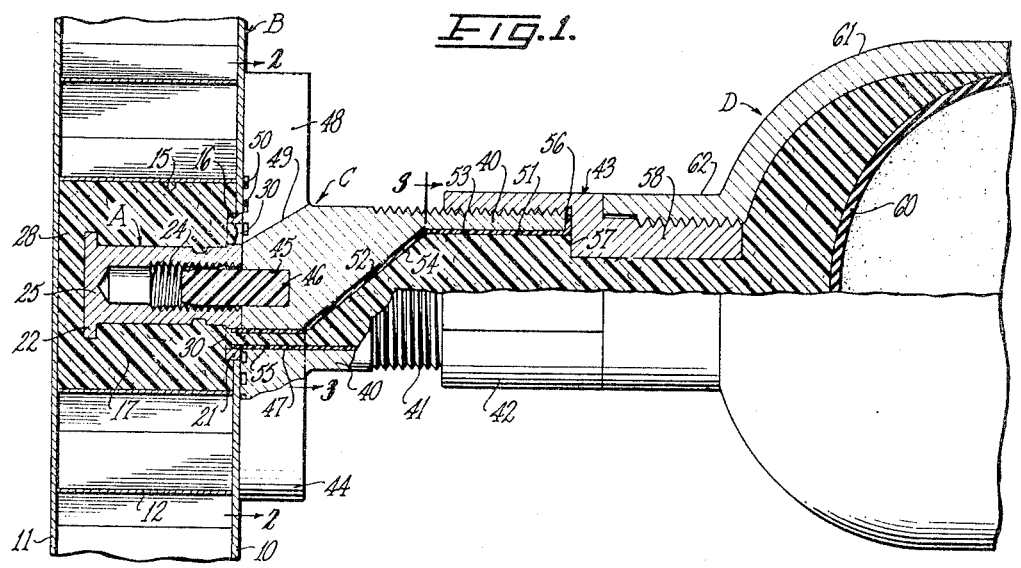
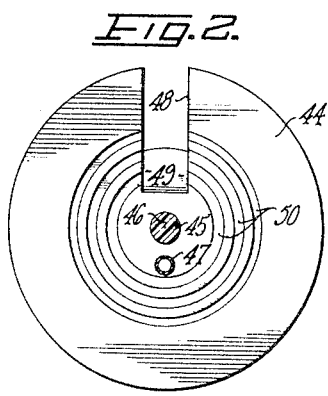
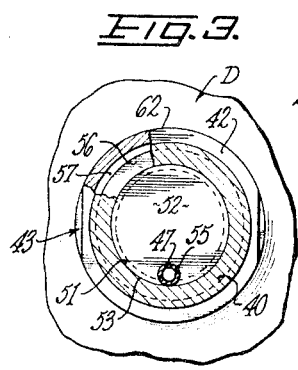
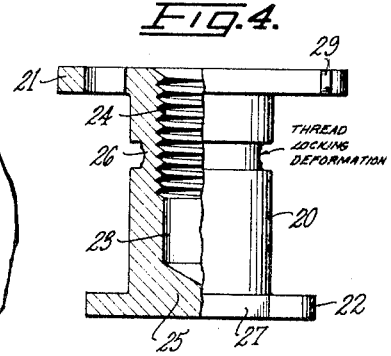
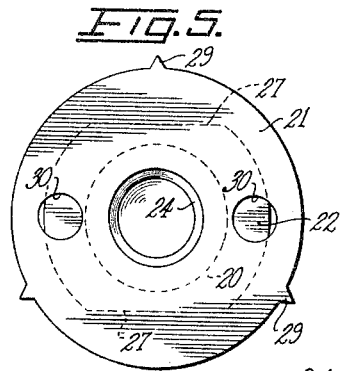
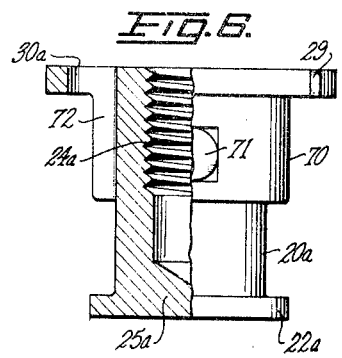
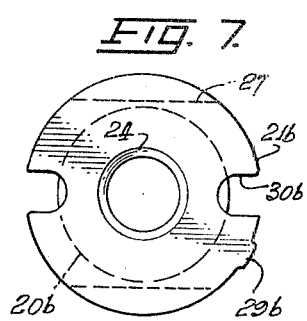
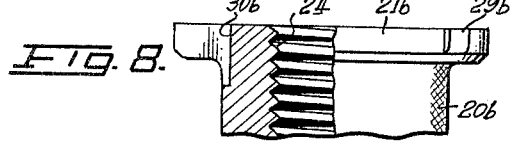
INVENTORS
FREDERICK W. ROHE
CHARLES S. PHELAN
BY Lynn H. Latta
ATTORNEY

United States Patent Office 3,271,498
Patented Sept. 6, 1966

3,271,498
METHOD OF INSTALLATION OF MOLDABLE
INSERT IN SANDWICH PANEL
Frederick W. Rohe, 5191 S. Bradford, Placentia, Calif., and Charles S. Phelan, Tustin, Calif.; said Phelan assignor to said Rohe
Filed Jan. 27, 1964, Ser. No. 340,212
6 Claims. (Cl. 264—261)

This application is a continuation-in-part of our U.S. application Serial No. 189,194, filed April 20, 1962 for Moldable Insert Fastener Assembly and Method and Means for Installation Thereof.

This invention relates to the installation of structural fasteners in lightweight, fragile-core sandwich panels, such fasteners being commonly known in the trade as "molded insert fasteners." This type of fastener includes an insert having a head in the form of a flat disc and a tubular body for reception of a fastener part such as a screw, and is anchored by means of a surrounding molded body of solidified resin potting material, within a hole bored through a skin sheet on one side of the panel and through the core, terminating adjacent the opposite skin sheet.

The most common insert of this general type is one in which the insert head is freely receivable in the circular aperture of the bored skin sheet, with its outer face exactly flush with the outer surface of such skin sheet, and with no direct mechanical connection between the head and the skin sheet itself. Such an insert however, has for many years presented problems of installation for which a more satisfactory solution than those hitherto available, has been greatly needed.

The general object of this invention is to provide an improved method of temporarily positioning and holding such an insert in the panel hole with the insert head flush with the bored skin sheet. In the past, the common method of installing such insert has been to fill the hole with a measured quantity of resin (e.g. epoxy) in liquid condition, mixed with a curing agent; to then project the insert into the hole until its head is fitted in the skin sheet aperture; and to then hold it in that position while the resin sets. Accurate positioning of the head in the plane of the apertured skin sheet so as to position the insert axis normal to the skin sheet, is required in order that satisfactory attachment of other parts to the panel can be established through the insert, and this can be accomplished by utilizing a suitable installation tool. However, in using such a tool to hold the insert in its proper position until the resin has set sufficiently to hold the insert, the operation is time-consuming and therefore expensive in labor cost.

In addition to the flush-head insert referred to above, the prior art has also provided an insert of a "snap-in" type, having a thicker head with an annular groove in its periphery to receive the margin of the skin sheet aperture, and having a frusto-conical expander shoulder leading up to the groove, and adapted when forced through the skin sheet aperture, to stretch the margin of the aperture sufficiently to snap through the aperture and seat the aperture margin in the annular groove of the insert head. However, we have found that in many instances the stresses thus set-up in the skin sheet around the aperture will cause the surrounding area of the skin sheet to warp and in some cases the insert will consequently be mounted in a position deviating somewhat from a true perpendicular relation to the surrounding skin sheet. In all cases, the insert head will project beyond the plane of the skin sheet, since it embodies a flange of substantial thickness defining the outer side of its annular peripheral groove, which outer flange overlaps the skin sheet. For these reasons, the insert with the flush-type head has been the preferred type, despite the much more difficult problems of rapid installation of this type than in the installation of the snap-in type.

In an effort to improve the earlier method of installing the flush-type insert by reducing the number of steps required therein, the art has more recently provided an improvement therein, involving the use of an insert with a port in its flush head, and the injection of the liquid resin from a gun through such port while the insert is held, by a suitable attachment to the gun, in a position centered in the hole in the panel and with its head received in flush relation in the skin sheet aperture. Here again, in using the gun to hold the insert temporarily in place, the gun is immobilized until the resin has set sufficiently to permit removal of the gun, and the need for a faster method of installing the flush head insert has endured throughout that stage of development of the art.

Our invention involves the concept of combining the advantages of the flush-type head and a direct supporting connection between head and skin sheet, with those of the molded-in insert. A specific and important object of our invention is to utilize a novel improved method of installation of an insert having a head in a skin sheet aperture in flush relation, and also having means for effecting a direct attachment of such head to the skin sheet with sufficient retention to temporarily hold it securely during the injection of the fluid resin.

A further object of the invention is to provide an improved method of anchoring an insert in a sandwich panel, in which the hole can be completely filled with the liquid resin without leaving air pockets therein and can be accurately filled without extruding resin past the insert head, whereby the necessity for cleaning away extruded excess resin is eliminated.

Other objects and advantages will become apparent in the ensuing specifications and appended drawing in which:

FIG. 1 is a fragmentary sectional view of a sandwich panel; and illustrating our improved method of installation of an insert therein;

FIG. 2 is an end view of the face of the installation gun nozzle;

FIG. 3 is a sectional view of the gun nozzle taken on the line 3—3 of FIG. 1, viewing the front end of the liner in end elevation;

FIG. 4 is a side elevational view, partially in axial section, of a preferred form of our improved insert, with integral means for effecting the step of temporarily securing the insert in the panel during setting of the potting compound;

FIG. 5 is a head end view of the same;

FIG. 6 is a side elevational view, partially in section, of a modified form of the insert;

FIG. 7 is a plan view of another modified form of the insert;

FIG. 8 is a fragmentary side elevational view, partially in section, illustrating several modified features of the insert utilized in the process.

General description

Referring now to FIG. 1 of the drawings, we have shown therein, as an illustrative example, one of our improved inserts, indicated generally at A, in the process of being installed in a sandwich panel B by an injection nozzle C attached to a gun D. The details of the gun do not form any part of the present invention and accordingly, only enough of the gun to illustrate the attachment of the nozzle C thereto, is shown. The sandwich panel B, shown by way of illustration of the general type of panel to which the invention may be applied, is one wherein spaced skin sheets 10 and 11 are united to the edges of a series of honeycomb cells constituting the lightweight, fragile core 12 of the panel. The core 12 may be fabricated of thin metal foil, of impregnated paper, or other equivalent material. The skin sheets 10 and 11 may be sheet metal (e.g. thin aluminum sheet) or may be of hard plastic or hard fibre (resin-impregnated paper) suitably bonded to the edges of the core cells by a suitable cement or other equivalent material.

In general, the invention provides for the preliminary insertion of the insert A into a hole bored through the skin sheet 10 and substantially through the core 12, resulting in a cavity 15 in the core which includes an annular series of pockets surrounding a bored cylindrical central area. Where the bored hole passes through the skin sheet 10, a circular aperture 16 is provided, the peripheral pockets of cavity 15 projecting radially beyond the aperture 16.

The invention provides, in the insert A, a circular disc head of slightly smaller diameter than the aperture 16, receivable therein with a sufficiently close fit to function as a stopper substantially closing the aperture, and provided with means for temporarily securing the same to the margin of aperture 16 pending the injection of potting compound 17 to fill the cavity 15.

The nozzle C may be used as the tool for pressing the insert into place in the panel hole, having means for mounting the insert thereon in coaxial relation thereto and having means for locating against the outer surface of skin sheet 10 to position the head of the insert in accurately flush relationship to the skin sheet when the head has been pressed into place in aperture 16 although a separate installation tool can be employed for this step. After the insert has been pressed into position, the nozzle C functions to inject the potting compound 17 through the insert head into the cavity 15, and when the cavity is filled, the nozzle can be withdrawn, leaving the insert self-supported in the aperture 16 during the period required for curing of the potting compound 17. The nozzle C has a self-cleaning feature which will be described hereinafter.

The insert A, in a preferred form (FIGS. 4 and 5) comprises a tubular body 20, which may be cylindrical as shown, a mounting head 21 in the form of an integral flat circular radial flange on one end of body 20, and an anchor head 22 of smaller radius, in the form of an integral radial flange on the other end of body 20. The body 20 has a bore 23 which preferably is internally threaded at 24 for at least a portion of its length, and may have a closed bottom defined by an integral central portion 25 of anchor head 22.

With the internal thread 24, the insert body 20 functions as a nut to receive a screw inserted through the mounting head 21, and the body 20 is provided with a suitable thread lock which, in the particular form of the invention shown in FIG. 4, is embodied in a radially inward deformation (so labelled in FIG. 4) of a reduced thickness neck 26 in an intermediate portion of body 20, the neck being defined by an external annular groove in the body 20.

Preferably, the anchor head 22 has a non-circular periphery which may have varying configurations as more specifically described hereinafter, but which, in the particular form shown in FIG. 4, is provided with one or more flat faces 27 interrupting an otherwise circular periphery. Thus, the head 22 may comprise a pair of diametrically opposed flats 27 and a pair of intervening circular segments of periphery. The flats 27 interlock with the potting compound 17 to lock the insert in the panel against rotation in response to torque forces imposed thereon during the insertion and removal of a screw. In the installed assembly shown in FIG. 1, the head 22 is spaced from the skin sheet 11 by a space which is filled by a layer 28 of potting compound, providing an adhesive connection between the head 22 and the skin sheet 11.

An important novel step in the present process is to temporarily secure the insert in the sandwich cavity 15 with the insert head disposed substantially in the plane of the bored skin sheet 10, and to thus support the insert in a proper position not only during the step of injecting a potting compound into the cavity, but also during the subsequent stage of setting of the compound to a solid condition in which it anchors the insert in place, permitting the injection gun to be immediately withdrawn after filling the cavity 15 and thus providing a very important improvement over the previous method of using the gun to hold the insert in position during the setting of the potting compound. In the embodiment of the method herein illustrated, there is utilized a temporary holding means integral with the insert. The immediate removal of the gun after filling the cavity 15 with potting compound, leaving the insert supported in proper position by the temporary attachment to the panel, is another important step in our method.

Attachment of mounting head 21 to skin sheet 10 is provided for by one or more small radial anchor teeth 29 on the otherwise circular periphery of the head. Teeth 29 have a height somewhat greater than the clearance space between the periphery of head 21 and the skin sheet aperture 16, so as to intersect and embed themselves in the aperture margin when the insert head is forced into the aperture. However, they are of sufficiently small volume so as to pierce the aperture margin without causing the skin sheet to become warped or depressed below its own plane. For example, where the insert head 21 has a diameter of one half inch and a clearance of .005 inch between its periphery and the margin of aperture 16, the mounting teeth 29 may have a radial height approximately in the range of .007 inch to .02 inch. The anchor teeth 29 are preferably of chisel-edge form, with an isosceles-triangular end contour as seen in FIG. 5, so as to enter the aperture 16 with a lancing action in the margin of the aperture, which can be effected by applying relatively light end pressure to the head as it is pushed into the aperture. In the head 21 are a pair of ports 30, one of which is utilized as an inlet for injection of the potting compound 17 through the head 16, and the other of which functions as a vent for the escape of air from the cavity 15 as it is displaced by the potting compound entering the cavity, and also functions as an inspection port.

Nozzle C comprises a cylindrical barrel 40 having at one end a male thread 41 for coupling into an internally threaded socket 42 of an adapter fitting 43; and having at its other end an integral anvil 44 in the form of a thick circular coaxial disc which projects as a radial flange from the barrel 40. Insert head 21 is pressed firmly into full contact with the face of anvil 44 by the resistance of skin sheet 10 to the penetration of anchor teeth 29. The barrel and anvil may be fabricated as a casting of aluminum or other suitable material. In the center of anvil 44 is a cylindrical axial bore 45 in which is mounted, by a press-fit, a pilot 46 of a tough, wear-resistant, slightly compressible material such as nylon or polyethylene, having a diameter such as to be received in the internally threaded section 24 of insert A with a close fit such that the insert will engage the pilot with a light (not tight) frictional engagement and be thereby held with its head 21 snugly seated against the front face of anvil 44 when the insert has been pressed onto the pilot.

In the anvil 44, at one side of its center, is an axially extending passage 47. In the opposite side of the anvil is a window 48 in the form of a radial slot having a width at least equal to the diameter of a port 30 which is adapted to be registered with the bottom area of the window 48. The bottom wall 49 of the slot is inclined forwardly toward the axis of the nozzle from the periphery of the barrel 40 where it joins the back face of anvil 44 to a radius at least as close to the axis as the inner extremity of port 30. Thus it becomes possible for the operator to sight through the window 48 during the step of injecting the potting compound into cavity 15, keeping the vent port 30 in full view until the potting compound has filled the cavity 15 and commences to exude through the vent port 30 which will indicate to him that the injection of potting compound is to be arrested.

Sighting through the vent port 30 in order to determine when the cavity 15 is sufficiently filled, is another important step in our method.

Utilizing the vent port 30 for the venting of gases from the cavity 15, is another important step of our method.

In the forward face of anvil 44 are a plurality of shallow concentric annular grooves 50 adapted to receive any excess potting compound which may inadvertently be extruded from the vent aperture 30, avoiding the possibility of the compound creeping between the face of the anvil and the insert head 21 and establishing an adhesive bond which might dislodge the insert as the gun is pulled away from the panel.

The barrel 40 defines, within itself, a chamber for the transfer of potting compound from gun D to the panel cavity 15, said chamber including a cylindrical bore 51, a funnel area defined by a wall 52 of asymmetrical conical contour, converging uniformly in straight lines from the cross sectional contour of bore 51 to the small cross sectional contour of passage 47. Passage 47 is positioned with its outer side aligned with the cylindrical wall of bore 51. The barrel chamber, and the passage 47, are lined by a thin-walled, disposable plastic liner including a cylindrical portion 53, a conical portion 54 fitted to the funnel wall 52, and a tubular nozzle tip 55 fitted snugly within the passage 47. The rear end of cylindrical body 53 is open and is provided with a radially outwardly projecting flange 56 which is clamped between the rear end of barrel 41 and an off-set radial shoulder wall 57 of adapter fitting 43. Fitting 43 includes an externally threaded neck 58 joined to the socket 42 by the offset portion which defines radial shoulder wall 57.

The nozzle 55 is of a length such as to project beyond the forward face of anvil 44 and into the inlet port 30 of insert head 21 as shown in FIG. 1. The liner 53–55 is preferably of a medium-soft plastic material such as polyethylene, such as to conform readily to the wall contours of barrel 41 to receive support therefrom, and such that the tip 55 can be snugly fitted in the inlet port 30 so as to be substantially sealed against backflow of the potting compound through the inlet port 30.

Gun D may be of any suitable known type having a piston 60 for applying pressure to a body of potting compound contained within the housing 61, and delivered under pressure through an internally threaded collar 62 into the adapter neck 58 threaded into the collar 62.

When a period of use of the gun is terminated, the nozzle unit C is unscrewed from the collar 62, the adapter 43 is removed from the barrel 40, thus exposing the flange 56, the latter is pried loose from the end of barrel 40 and is grasped to withdraw the liner 53–55 from the barrel 40, and the liner with its residual potting compound therein is discarded as waste material. This leaves the internal surfaces of the barrel 40 and passage 47 clean, without any potting compound adhering thereto. The two sections of the nozzle assembly may then be further cleaned in a suitable solvent to remove any vestiges of the potting compound, and so as to be in proper condition for the next period of use. The gun is, of course, cleaned in accordance with conventional practice.

Our improved method will now be clearly apparent from a brief review of the installation procedures hereinbefore referred to. In preparing a panel for a series of inserts located on predetermined centers, such centers are marked on the panel, or located by a suitable jig, and a series of holes are then bored in the panel, using a suitable end-cutting boring tool, of the proper diameter to provide bores just slightly larger in diameter than the heads of the inserts that are to be installed.

The gun is then loaded with a prepared liquid mixture of resin and catalyst, the nozzle assembly C is fitted with a fresh liner, its two sections are coupled together, and it is then attached to the gun. In succession, a series of inserts A are attached to the forward face of anvil 44 by pushing the pilot 46 into the threaded bore of each insert and pressing the end face of the insert head 21 into full seating engagement with the face of anvil 44, after first rotating the insert until one of its ports 30 registers with the anvil window 48 and its other port 30 registers with and receives the projecting end portion of nozzle tip 55. Using the gun as a handle, the insert is then projected through a selected aperture 16 and its head 21 fitted in the aperture. End pressure is then applied to force the anchor teeth 29 into the aperture margin, until the forward face of anvil 44 is in full face-to-face contact with the skin sheet 10. This will automatically result in the proper positioning of the insert in coaxial relation to the cavity 15 and with its head 21 in flush relation to skin sheet 10. The gun is then operated to express the potting compound through the nozzle unit C and its tip 55, thence through the inlet port 30 of the insert and into the cavity 15, gradually filling the same. Entrapped air in the cavity will be vented through the vent port 30 and the window 48. During the filling operation, the operator will inspect the vent port 30 through the window 48 until the potting compound appears in the vent port 30, whereupon he will discontinue the injection operation and will promptly pull the gun away from the panel, withdrawing the pilot 46 from the bore of the insert and withdrawing the nozzle 55 from the inlet port 30. The attachment of the head 21 to the skin sheet 10 by the embedding of anchor teeth 29 in the margin of aperture 16 suffices to hold the insert securely in its coaxial, flush position in the panel, without being dislodged by the withdrawal of the parts 46 and 55; and will continue to support the insert in its coaxial, flush position until the potting compound 17 has set sufficiently to provide adequate support. As the potting compound hardens around the insert, it provides a secure interlocking engagement with the insert and with the inner face of the skin sheet 10 at the ends of the radially projecting pocket portions of cavity 15, such as to securely resist displacement of the insert from its fixed position in the panel, under the torque load of screwing a fastener screw into the insert, or under axial load transmitted through the screw to the insert from a part that is attached to the panel by the insert.

The converging funnel portion 54 of the nozzle liner is such as to eliminate any corner pockets in which potting compound could escape from the flowing stream of compound passing through the nozzle and harden so as to eventually obstruct the nozzle tip 55. It provides a converging approach from the large cross sectional area of cylindrical portion 53 to the relatively small cross sectional area of nozzle tip 55, wherein all areas are subjected to the scavenging flow of the potting compound through the nozzle and cannot encourage the build-up of a deposit of hardened compound.

FIG. 6 illustrates a desirable modification of the insert shown in FIGS. 4 and 5, wherein the tubular insert body 20a has an enlarged shoulder portion 70 having a cylindrical radial bore in which is mounted a locking pellet 71 of a tough, slightly yieldable plastic material such as nylon, having an inner end projecting for interference engagement with the threads of the screw that is threaded into bore 24a. The ports 30a in head 21 have extended portions 72 in the form of channels in opposite sides of shoulder 70, and such channels will be filled by potting material, which, when hardened, will form ribs or keys interlocking with the shoulder 70 to resist torque loads to which the insert may be subjected. In this case, the anchor head 22a may be of plain circular flange form.

One of the important advantages of our improved insert and installation is the ease with which they can be utilized in either vertical or overhead panels.

It should be understood that the invention, as it relates to the inesrt, is not restricted to any specific configuration in the means on the insert body for interlocking engagement with the body of potting material. Any projection, recess or surface of non-circular cross-section which will establish a shear relationship to the contacting potting material, sufficient to provide adequate torque load holding action, may be employed.

The number of anchor teeth 29 may vary from a large number of closely spaced teeth of very slight radial projection down to a single tooth adapted to be embedded in the aperture rim at one side thereof and to wedge the opposite side of the insert head 21 into tight frictional or interference engagement with the opposite side of the aperture rim. FIGS. 7 and 8 illustrate the use of a single anchor projection. Also, as illustrated in FIGS. 6, 7 and 8, in lieu of a tooth with a sharp peripheral edge for lancing action, the tooth 29b, as illustrated in FIGS. 7 and 8, can be relatively wide circumferentially and of only slight radial height, and adapted for embedding itself in the aperture rim by a wedging action. To this end, the projection 29b can be of wedge or ramp shape, having substantially no height at the inner margin of the head 21b and gradually increasing in radial height toward the outer margin of the head 21b. Also, its ramp surface may be rounded in an axial direction as indicated in FIG. 8, so as to provide a crown surface substantially parallel to the cylindrical peripheral surface of head 21b in the area near the outer margin of the latter, thereby decreasing the likelihood of the wedge shaped tooth becoming loose from its gripping engagement with the aperture margin.

FIGS. 7 and 8 also illustrate another possible modification of the insert construction, utilized in inserts of a smaller range of diameters. In this range, the peripheral diameter of the outer head of the insert may be too small to accommodate the closed apertures of FIG. 5. Accordingly, for this range of inserts, the apertures 30b, open at the periphery of the head 21b, are utilized. The method of installing the insert of FIGS. 7 and 8, remains however essentially the same as that described above.

The body 20b of the insert of FIGS. 7 and 8 is provided with a knurled external surface as indicated in FIG. 8, for increasing the anchorage against rotation in the anchoring body of potting compound, thus assisting the flatted sides 27 of the inner head and the anti-rotation embedment of the projection 29b in the margin of the aperture.

We claim:

1. In the art of installing a fastener insert in a sandwich panel embodying a fragile, low density core sandwiched between spaced solid skin sheets, the method comprising the following steps: providing a hole in said panel beginning with an aperture in one of said skin sheets and extending into said core; utilizing an insert including a mounting head proportioned to fit snugly within said aperture, and having a pair of spaced ports therein, and a hollow body of smaller diameter than said head, extending axially therefrom and receivable in said hole within said core; projecting said insert into said hole and moving said head into closing relation to said aperture; providing a temporary supporting attachment between said head and skin sheet; subsequently injecting potting material through one of said ports into said hole by applying the nozzle of an injection gun to one of said ports; venting said hole through the other port as the potting material fills the hole and displaces air therefrom; visually inspecting said venting port to avoid injection of excess potting material into the hole; arresting the injection operation when sufficient potting material has been injected as thus determined; withdrawing said gun from the insert before said potting material has set and utilizing said temporary supporting attachment to hold said insert in position while said potting material hardens around said insert.

2. The method defined in claim 1, wherein an injection gun attachment having a pilot insertible in said insert and a nozzle tip insertible simultaneously in said port, and an anvil for positioning engagement with said skin sheet, is utilized as a handling implement for inserting said insert into said hole, for positioning the insert head in flush relation to said skin sheet, and for injecting the potting material through said port while holding the insert in said positioned relation; and including the step of removing the gun as soon as the hole is filled with potting material.

3. The method defined in claim 2, including the further step of utilizing a disposable liner within said gun attachment to shield the internal walls thereof from contact with said potting material, and providing on said liner the aforesaid nozzle tip which is coupled within said port to deliver the potting material beyond the forward end of the attachment without contact therewith, and removing and disposing of said liner when a period of use of the gun is completed.

4. The method defined in claim 1, including the inspecting of said venting port during the injection of potting material, and arresting the injection operation when the potting material commences to exude from said venting port.

5. In the art of installing a fastener insert in a sandwich panel embodying a fragile, low density core sandwiched between spaced solid skin sheets, the method comprising the following steps: providing a hole in said panel beginning with a circular aperture in one of said skin sheets and extending into said core; utilizing an insert including a circular mounting head of a diameter to fit snugly within said aperture and having a port therein, and a hollow body of smaller diameter than said head, extending axially therefrom and receivable in said hole within said core; providing on the periphery of said head, at least one integral radial tooth of a radial height to slightly intersect the margin of said aperture when said head is received therein; projecting said insert into said hole; moving said head into coaxial adjacency to said aperture; applying end pressure to press said head into said aperture so as to embed said tooth into the margin of said aperture, thereby establishing a temporary supporting attachment between said head and skin sheet; subsequently injecting potting material through said port into said hole; detaching the gun from the insert as soon as the injection step is completed; and utilizing said temporary supporting attachment to hold said insert in position while said potting material hardens around said insert.

6. The method defined in claim 1, wherein said temporary supporting attachment is effected by establishing an interference fit between the periphery of said insert head and the edge of said skin sheet aperture.

References Cited by the Examiner
UNITED STATES PATENTS

| | | | |
|---|---|---|---|
| 2,880,830 | 4/1959 | Rohe | 189—34 |
| 3,016,578 | 1/1962 | Rohe | 264—262 |

ROBERT F. WHITE, *Primary Examiner.*

L. S. SQUIRES, *Assistant Examiner.*